Patented Apr. 28, 1942

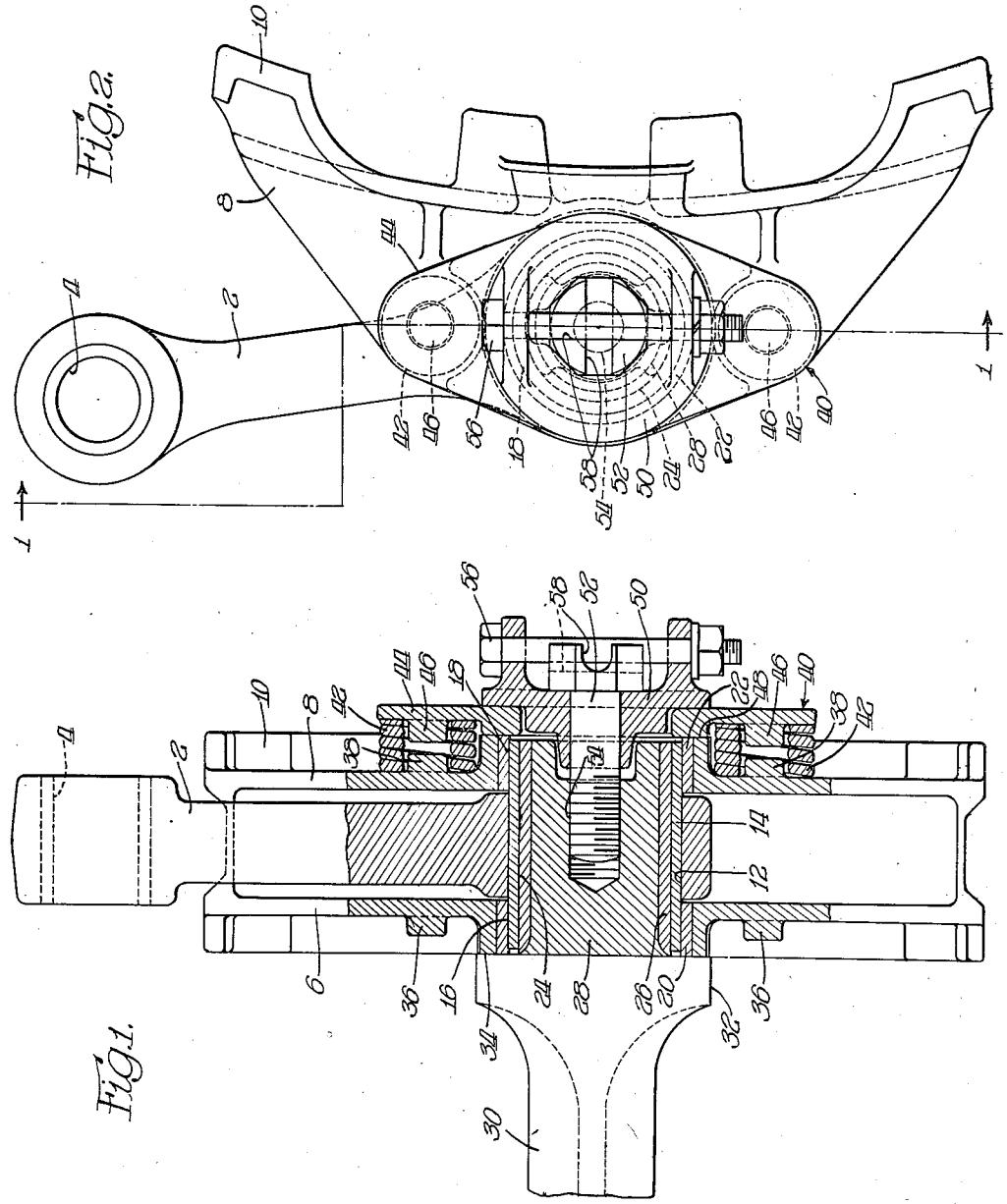

2,281,535

UNITED STATES PATENT OFFICE 2,281,535

PIVOTAL MEANS AND METHOD OF ASSEMBLY

William C. Drews, Maywood, Ill.

Application March 17, 1941, Serial No. 383,679

15 Claims. (Cl. 188—230)

My invention relates to a novel brake arrangement of a brake beam, brake head, and a supporting brake hanger and to a novel method of assembly therefor.

In the usual form of brake head assembly the bushed brake head and supporting brake hanger are each afforded bearing on the trunnion end of the supported brake beam.

My invention includes a novel assembly wherein the bushing on the supporting brake hanger affords bearing for the brake head and bears on the trunnion end of the supported brake beam.

An object of my invention is to design a novel brake head assembly which is particularly adapted to give long life under service conditions.

Another object of my invention is to design a brake head assembly where substantially maximum area of bearing surface is afforded between the brake hanger bushing and the trunnion end of the brake beam so that greater life of the assembly is obtained.

A specific object of my invention includes a bushing having its central portion press-fitted in the brake hanger and having end portions which support the associated brake head, said bushing having bearing along substantially the length of the trunnion end of the supported brake beam.

A further object of my invention is to devise a novel method of assembling a brake rigging wherein after a brake hanger and brake head are positioned in assembled relationship, a bushing is press-fitted in said hanger with its end portions supporting and sleeved within said brake head. The brake head and brake hanger thus assembled may be handled as a unit and are slipped over the trunnion end of a brake beam with the hanger bushing bearing on substantially the whole length of said trunnion end.

In the drawing, Figure 1 is a fragmentary sectional view of a brake rigging embodying my invention, the section being taken substantially in the vertical planes indicated by line 1—1 of Figure 2.

Figure 2 is a side elevation of the brake rigging shown in Figure 1.

The brake hanger 2 is formed at its upper end with a bushed eye 4 affording a pivotal connection to a supporting frame member (not shown). The opposite end of said hanger 2 is accommodated between the inboard and outboard walls 6 and 8 of the brake head 10 and is afforded an eye 12 in which may be tightly fitted, as by a press fit, the central portion of the hanger bushing 14. The end portions of the hanger bushing 14 project from opposite sides of said hanger and afford bearing as at 16 and 18 for the bushings 20 and 22 fitted respectively in the inboard and outboard walls 6 and 8 of the brake head 10. The inner surface of the hanger bushing 14 bears as at 24 against the bushing 26 fitted on the trunnion end 28 of the fragmentarily shown brake beam 30. It may be noted that the hanger bushing 14 engages substantially the whole length of the bushing 26 and supports the brake head 10 at its end portions.

On the brake beam 30 is formed an annular shoulder 32 against which the inboard wall 6 of the brake head 10 may be seated as at 34. On the inboard and outboard walls 6 and 8 are spaced spring positioning lugs 36, 36 and 38, 38 respectively, said lugs being symmetrically arranged to permit convenient mounting of the balancing device generally indicated at 40 when the position of the brake head is reversed. Briefly, the balancing device 40 comprises spaced springs 42, 43 compressed between the spring plate 44 and the outboard wall 8 and positioned by the lugs 38, 38 and the aligned lugs 46, 46 on the spring plate 44. The spring plate 44 is held in abutment as at 48 with the brake head by the lock washer 50 which is secured against said plate by the bolt 52 extending through said washer for threaded engagement at 54 with the trunnion end of the brake beam. The lock washer 50 may be retained against accidental dismantling or loosening by the retaining bolt 56 extending through spaced lugs on the lock washer and engaging one of the grooves or slots 58, 58 formed in the head of the securing bolt 52.

In my novel method of assembly, the brake hanger 2 is placed in its normal position between the inboard and outboard walls 6 and 8 of the brake head with the eye 12 in alignment with the openings defined by the bushings 20 and 22. The central portion of the hanger bushing 14 is then press-fitted in the eye 12 of the hanger and its end portions bear against the bushings 20 and 22 of the brake head for support thereof. As thus assembled the brake head and brake hanger may be handled as a unit and are slipped over the trunnion end 28 with the hanger bushing 14 engaging the major portion of the length of said end. The brake head and hanger are secured on the end of the brake beam in any convenient manner shown here as by the arrangement of the above described balancing device 40. Thus the brake head is pivotally supported on the end portions of the hanger bushing 14 and the trunnion end of the brake beam is pivotally supported in the hanger bushing 14.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a brake assembly, a brake head having spaced walls with aligned openings, a brake hanger having an end accommodated between said walls and having an opening aligned with said first-mentioned openings, a bushing fitted in said hanger and projecting into said aligned openings in said brake head whereby said head and hanger may be handled as a unit, and a brake beam having a trunnion end projecting into said bushing and supported by said hanger.

2. The method of pivotally connecting a brake head and supporting hanger on a supported brake beam comprising, press-fitting a central portion of a bushing in said hanger with end portions of said bushing sleeved within said head after said hanger and said head have been positioned in assembled relationship, and mounting said assembled brake head and hanger on a trunnion end of said beam with said bushing engaging said trunnion end.

3. The method of pivotally connecting a brake head and supporting hanger on a supported brake beam comprising, assembling said brake head and brake hanger in their respective positions, press fitting a bushing in said hanger with end portions of said bushing supporting said head, and sleeving said assembled brake head and brake hanger over the end of said brake beam.

4. In a brake assembly, a brake head having spaced walls with aligned openings, a brake hanger having an end accommodated between said walls and having an opening aligned with said first-mentioned openings, a brake beam having a trunnion end projecting into said openings and supported by said hanger, and a bushing sleeved over said end affording bearing at the ends thereof for said head and press-fitted in said hanger.

5. In a brake assembly, a brake head having spaced walls with aligned openings, a brake hanger having an end accommodated between said walls and having an opening aligned with said first-mentioned openings, a bushing press-fitted in said hanger and projecting into said aligned openings in said head, and a brake beam having a trunnion end projecting into said bushing and supported by said hanger.

6. The method of pivotally connecting a brake head and supporting hanger on a supported brake beam comprising, press-fitting a bushing in said hanger with end portions sleeved within said head so that said head and hanger may be handled as a unit in their normal assembled relationship, and then sleeving an end of said brake beam within said bushing.

7. In a brake assembly, a brake beam having a bushed trunnion end, a brake head associated with said end, a hanger lever supporting said beam and said head, and a bushing sleeved over said end between said end and said hanger and brake head, said bushing being tightly fitted in said hanger and supporting at the ends thereof said brake head.

8. In a brake assembly, a brake beam having a bushed trunnion end, a brake hanger supporting said beam, a bushing press-fitted in said hanger bearing against said bushed trunnion end for a major portion of its length, and a brake head pivotally supported on said bushing.

9. In a brake assembly, a brake beam having a bushed trunnion end, a brake head and brake hanger assembled as a unit with a bushing press-fitted in said hanger and supporting said head, said trunnion end being accommodated within said bushing and supported by said hanger.

10. In a brake arrangement, a brake beam having a trunnion end, an assembled brake head and hanger on said end including a bushing press-fitted in said hanger and supporting said head, said bushing having bearing on substantially the whole length of said trunnion end.

11. In a brake assembly, a brake beam, a supporting brake hanger having a pivotal connection with said beam, said connection including a bushing press-fitted in said hanger, and a brake head pivotally supported on the ends of said bushing.

12. In a brake assembly, a brake beam, a supporting brake hanger having a pivotal connection with said beam, a bushing tightly fitted in said hanger and having end portions projecting from opposite sides thereof, and a brake head pivotally supported by said end portions.

13. In a brake assembly, a brake beam, a supporting brake hanger having a pivotal connection with said beam, a bushing having its central portion press-fitted in said hanger and end portions extending from opposite sides thereof, and a brake head supported by said end portions.

14. In a brake assembly, a brake beam having a trunnion end, a supporting brake hanger having a bushing fitted therein and sleeved over said end, and a brake head supported on the ends of said bushing.

15. In a brake assembly, a brake beam, a supporting brake hanger having a connection to said beam, said connection including a bushing tightly fitted in said hanger, and a brake head supported on the ends of said bushing.

WILLIAM C. DREWS.